Figure 7:
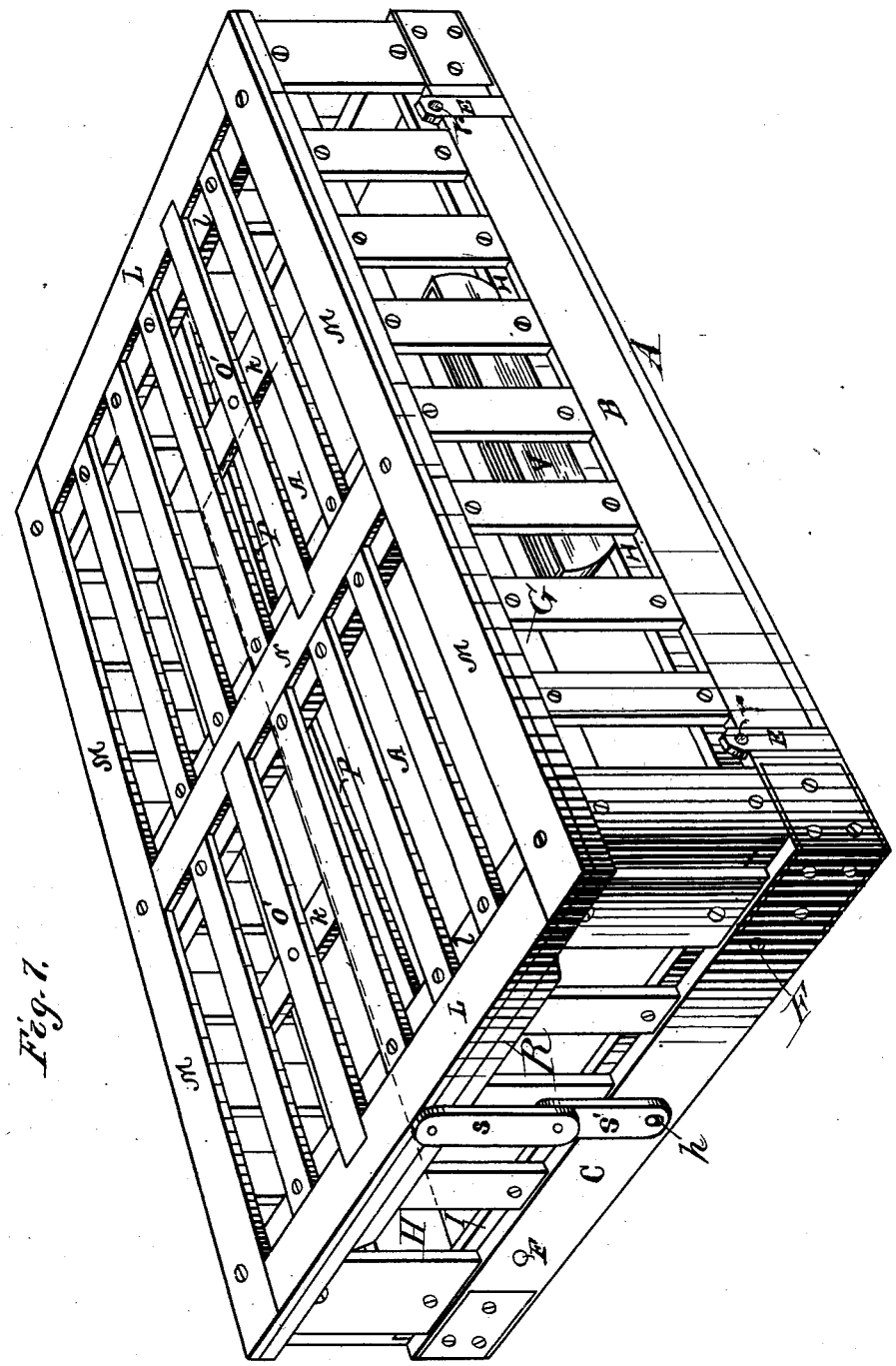

(Model.) 3 Sheets—Sheet 1.
J. W. COOLEY.
Poultry Coop.
No. 241,934. Patented May 24, 1881.
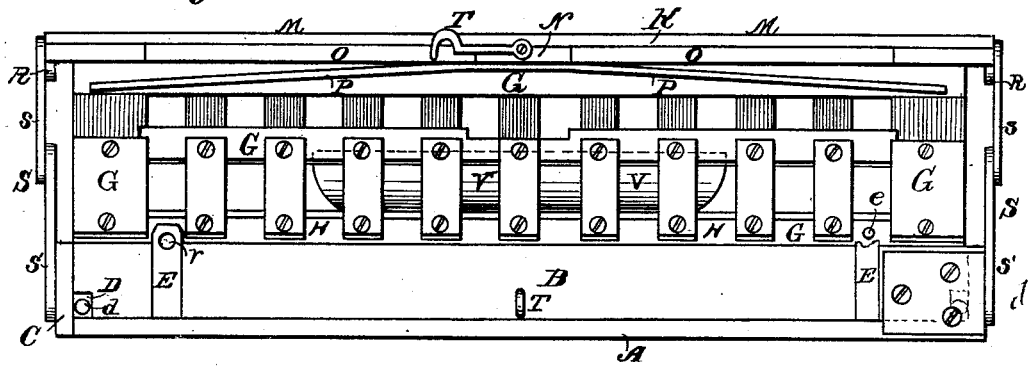
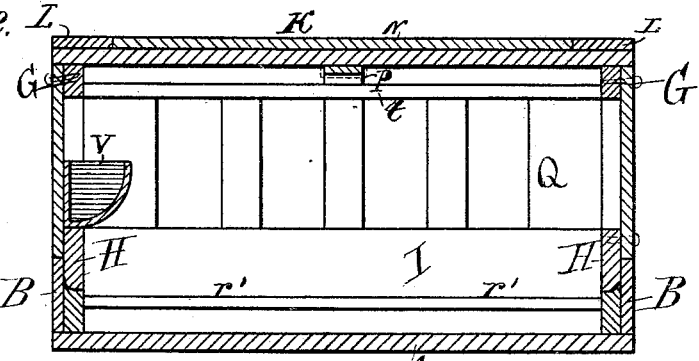
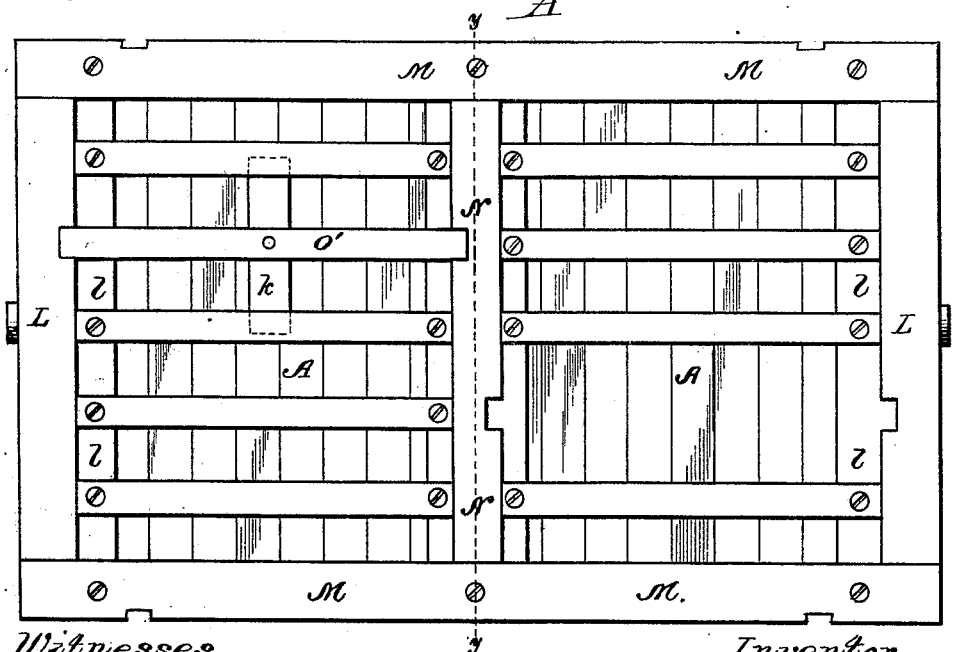
Witnesses.
Henry Frankfurter,
Frank Johnson
Inventor.
per. Joseph W. Cooley
Harry Harrison
Attorney (Model.)
3 Sheets—Sheet 2.
J. W. COOLEY.
Poultry Coop.
No. 241,934. Patented May 24, 1881.
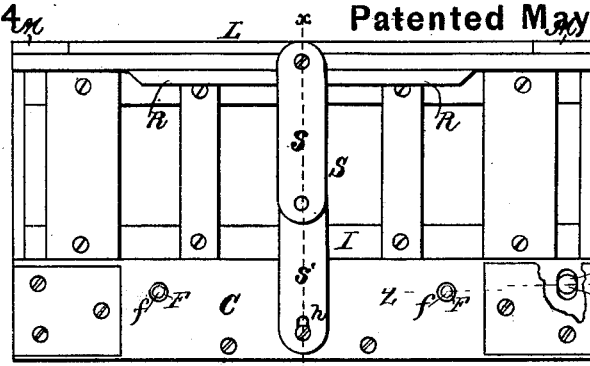
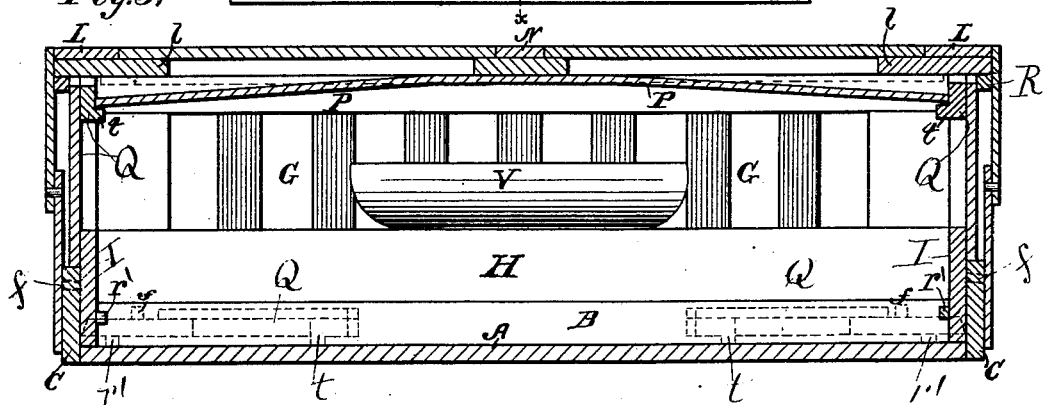
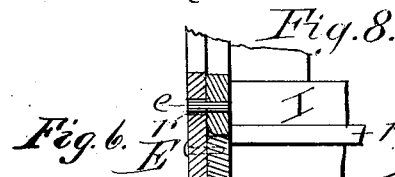
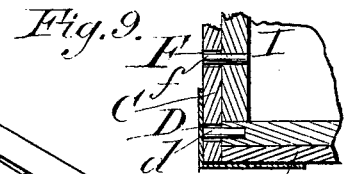
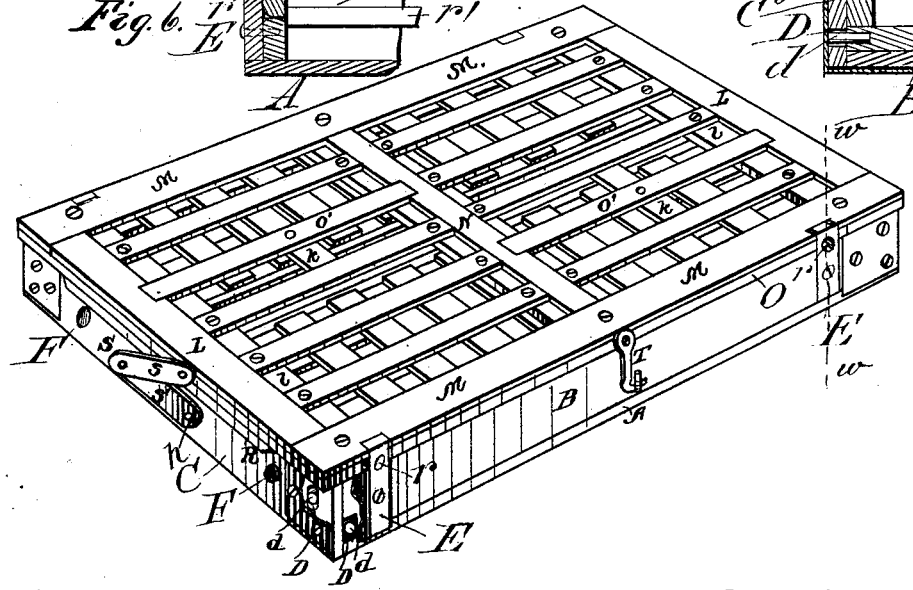
Witnesses
Henry Frankfurter
Frank Johnson
Inventor
Joseph W. Cooley
per Harry Harrison
Attorney (Model.)  3 Sheets—Sheet 3.

J. W. COOLEY.
Poultry Coop.

No. 241,934. Patented May 24, 1881.

Witnesses
Henry Frankfurter
Frank Johnson
per:

Inventor,
Joseph W. Cooley
Harry Harrison
Attorney.

UNITED STATES PATENT OFFICE.

JOSEPH W. COOLEY, OF CHICAGO, ILLINOIS.

POULTRY-COOP.

SPECIFICATION forming part of Letters Patent No. 241,934, dated May 24, 1881.

Application filed March 15, 1881. (Model.)

*To all whom it may concern:*

Be it known that I, JOSEPH W. COOLEY, a subject of Great Britain, residing at Chicago, in the county of Cook and State of Illinois, have invented a certain new and useful Improvement in Poultry-Coops, of which the following is a specification.

The objects of my improvements are, first, to provide a coop which will fold into a small space and when erected for use will be firm and withstand strain from wear or rack; second, to provide a folding coop with a stationary trough which will not interfere with the folding up of the coop; and, third, to furnish a folding coop which will accommodate itself to folding, adjustment, shrinkage, and swelling. I attain these objects by the particular arrangement, construction, and combination of the several parts, as illustrated in the accompanying drawings, in which—

Figure 1, Sheet 1, is a side view, partly open. Fig. 2, Sheet 1, is a cross-section through the line $y y$ of Fig. 3. Fig. 3, Sheet 1, is a top view. Fig. 4, Sheet 2, is an end view. Fig. 5, Sheet 2, is a sectional view on the line $x x$ of Fig. 4. Fig. 6, Sheet 2, is a perspective view showing the coop folded or closed. Fig. 7, Sheet 3, is a perspective showing the coop open ready for use. Fig. 8, Sheet 2, is a section on the line $w w$ of Fig. 6; and Fig. 9 is a sectional detail.

Similar letters of reference refer to similar parts throughout the several views.

A is the bottom or floor of my coop, made of any suitable material.

B B represent side pieces, which are fastened to A by nails, screws, or otherwise.

C C are end pieces secured to A by screws, nails, or otherwise, and jointed or connected to B B at the corners by bands or other suitable connection.

D D are sockets, slots, or elongated bearings for the reception of the journals $d\ d$. The slots D D are made in an oval or elongated shape, so as to permit the journals $d\ d$ to turn and at the same time allow the ends I I to turn on their lower inside square corners, thereby dispensing with rounded inside corners.

E E are bands fastened to B B, having holes $r\ r$ for the reception of pieces $e\ e$, which bands E E and pieces $e\ e$ are for the purpose of taking the weight or lift entirely off of all the journals and to keep the coop from racking. When the coop is closed the ends of E E are on a level with the top of the coop.

F F are holes in C C for the reception of pins $f\ f$, the holes F F and pins $f\ f$ being for the same purpose as E E and $e\ e$.

G G represent the side inside folding frames, made with lower square inside corners and lower rounded or beveled outside corners, and provided with slats, as shown.

Q Q represent the end inside folding frames, made similarly to G G, except they are provided with strips $r\ r$ and $t\ t$.

H H are the lower side pieces of G G, having rounded or beveled lower outside corners, so as to allow them to swing and rest against B B when erect, and are provided with pins $e\ e$, and have lower inside square corners, as shown.

I I are the lower pieces of Q Q, and are made in all respects as H H, with the exception that they have on the inside the pieces $r'\ r'$, which extend the inside entire width of the coop I I, are pivoted and fold similarly to H H.

$t\ t$ are strips or pieces secured to the upper inside of the folding frames Q Q. They extend the entire inside width of the coop, and are for the purpose of regulating the size of the trough to any dimension, and to prevent the trough from interfering with the folding, the pieces $r'$ $r'$ on I I being for the same purpose. One of the slats of the ends Q Q is cut, and also the portion of the top cross-pieces of Q Q, as shown, which, for convenience, is done at the center, and are for the purpose of receiving the spring P, and allowing the ends Q Q to pass into an erect position, the spring P holding the ends Q Q in position, and the ends Q Q holding the sides G G.

K is the top, made, as shown, of two end pieces, L L, and two side pieces, M M, and a center cross-piece, N. The end pieces, L L, are provided with under pieces, $l\ l$, which extend inwardly sufficiently to allow a rest for the slats. $l\ l$ are larger than the upper L L, extending from side to side. A cheaper construction is to have the ends L L of one level piece, the slats to extend to the edge, the removable slat resting in a space cut out for that purpose.

M M are side pieces of the top K, having underneath attached small strips O O, which, by bearing against the upper part of the side pieces, serve to keep the top in position when open, and when the coop is closed to present a tight joint.

N is the center cross-piece, made in two pieces, as shown, the bottom being wider than the upper, whereby a rest is provided for the slats. N and l l each may be made in one piece, the slats extending the entire length of the coop, resting upon the ends and center piece.

O' O' are removable slats provided with buttons k k, and are for the purpose of opening the coop for the reception or removal of poultry.

P is a spring, made of wood, extending the entire inside length of the coop. It is firmly secured to the under side of the center piece, N, and is for holding the ends Q Q firmly when erect.

R R are strips attached to the ends L L of the top K. They keep the ends Q Q in position when erect, and the top K in position when folded.

S S are folding-strips composed of two pieces, s' s' working on a center. s' s' have elongated slots h h for the bearing of screws or rivets, and to accommodate the coop to swelling and shrinkage. S S are for the purpose of folding and opening the coop.

T is a hook having a catch to hold the several parts together when folded.

V is a stationary trough made of any suitable size, so as not to interfere with the folding. One may be on each side of the coop, and are for feed or water.

d d are journals on G G and Q Q, and are one and the same piece with them. They are only for the purpose of guides for folding, and bear the strain or weight.

The operation is as follows: The coop is supposed to be folded up. T is unhooked; the top, sides, and ends are raised, when the coop will be ready for the reception of poultry. To fold the coop the spring P is raised, which allows the end frames to fold; the sides will fall down upon the ends; the top lowers, and the several parts are folded; the hook T is fastened, when the coop will be ready for storage or return shipment.

What I claim as new and as my invention, and desire to secure by Letters Patent, is—

1. In a folding coop, the combination, with the strips B and bands E E, having apertures r r, of the pivoted side pieces, H, having pins e e, substantially as specified.

2. In a folding coop, the combination, with the end strips, C, having apertures F F, of the pivoted strip I, provided with pins f f, substantially as set forth.

3. In a folding coop, the combination, with the floor A and pieces B C, having pin-apertures, of the folding frames G H Q I, provided with pins e f, journals d d, lower inside square corners, and lower outside rounded or beveled corners, substantially as described.

4. In a folding coop, the combination of the floor A, perforated side and end pieces, B C, side folding frames, G H, having pins to engage with the perforated bands E E, and folding frames Q I, provided with strips r' t, and pins f f, engaging with the perforated end pieces, C, top K, having strips O, and removable slats O', spring P, strips R R, folding strip S, hooks T, and trough V, all constructed and arranged, substantially as and for the purpose shown and described.

JOSEPH W. COOLEY.

Witnesses:
J. TAYLOR HAIR,
FRANK JOHNSON.